United States Patent [19]
Weyermanns

[11] Patent Number: 5,694,777
[45] Date of Patent: Dec. 9, 1997

[54] PROCESS AND DEVICE FOR PELLET-FREEZING POORABLE AND FLOWABLE MATERIALS

[75] Inventor: Gunther Weyermanns, Duisburg, Germany

[73] Assignee: Buse Gase GmbH & Co., Germany

[21] Appl. No.: 296,735

[22] Filed: Aug. 26, 1994
(Under 37 CFR 1.47)

[30] Foreign Application Priority Data

Aug. 30, 1993 [DE] Germany ............ 43 29 110.4

[51] Int. Cl.[6] ............................................. F25D 17/02
[52] U.S. Cl. ............................ 62/64; 62/78; 62/373
[58] Field of Search ............................. 62/64, 68, 69, 62/70, 78, 373

[56] References Cited

U.S. PATENT DOCUMENTS

| | | | |
|---|---|---|---|
| 2,448,802 | 9/1948 | Holzcker | 62/68 |
| 3,228,838 | 1/1966 | Rinfret et al. | 62/78 |
| 4,704,873 | 11/1987 | Imaike et al. | 62/68 |
| 4,761,962 | 8/1988 | Andersson | 62/68 |
| 4,848,094 | 7/1989 | Davis et al. | 62/78 |
| 5,165,256 | 11/1992 | Yamada | 62/70 |
| 5,222,367 | 6/1993 | Yamada | 62/70 |

Primary Examiner—Ronald C. Capossel
Attorney, Agent, or Firm—Connolly & Hutz

[57] ABSTRACT

The invention relates to a process and to a device for pellet-freezing pourable and flowable materials in a low-boiling liquefied gas (11) which is located in the interior of an insulated housing (1) having an aperture for introducing the material to be frozen. To generate a cascade-like flow (12), in which small drops can be frozen individually, coupled with a small surface area requirement of the immersion bath, there is, according to the invention, in the interior of the housing (1), a reaction tube (2) with an agitator (3) which is arranged at the lower end, the charging device (13) for the material to be frozen being arranged above the aperture (18) thereof.

11 Claims, 1 Drawing Sheet

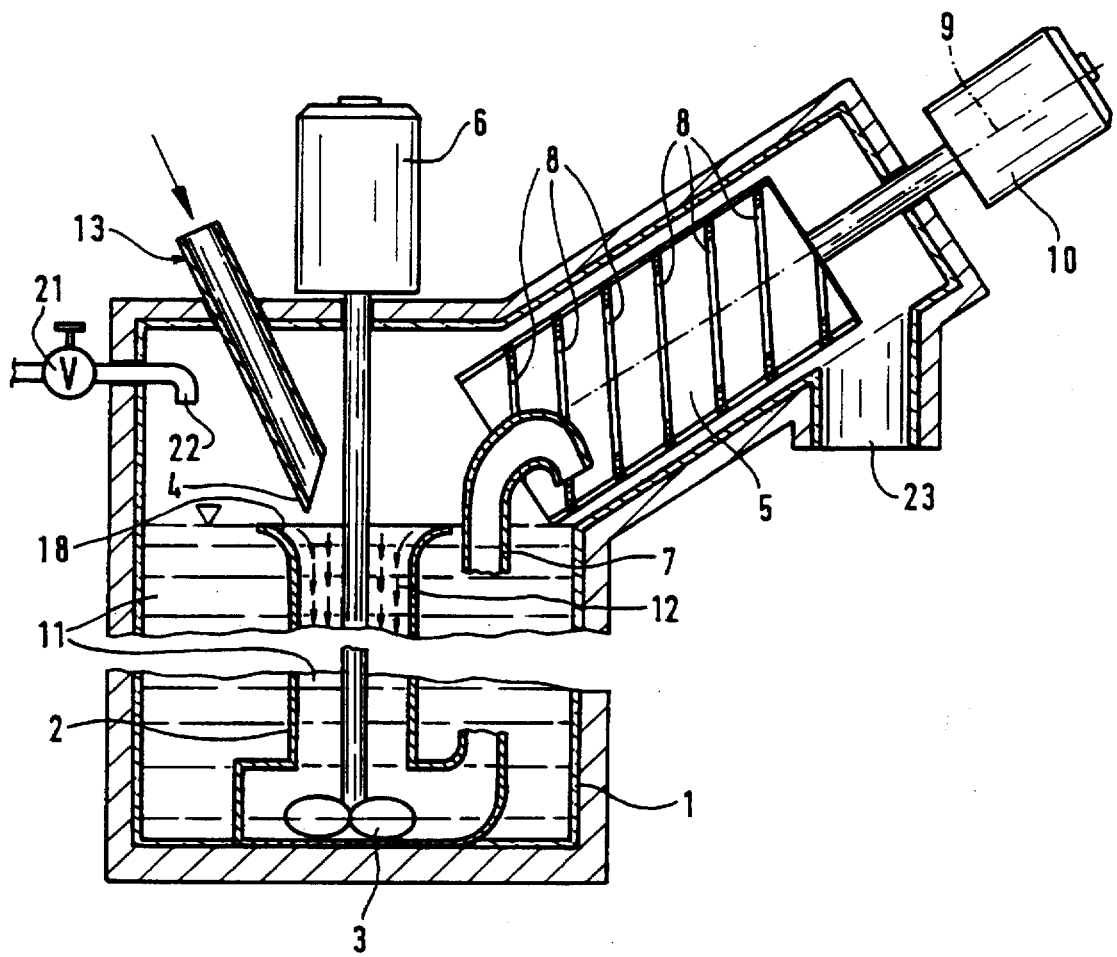

PROCESS AND DEVICE FOR PELLET-FREEZING POORABLE AND FLOWABLE MATERIALS

BACKGROUND OF THE INVENTION

The freezing of pourable and flowable materials is as a rule carried out in such a way that the materials, for example in the form of drops, are introduced directly into a bath of a low-boiling liquefied gas, usually nitrogen, and frozen therein. For the transport through such immersion baths and for taking the frozen materials out of the immersion baths, transport belts are used. Such a device is shown in German Patent Specification 3,711,169. Such devices are very suitable for continuous production on an industrial scale in the case of medium to large drop sizes. In particular, however, the immersion bath with the associated transport belt has a large space requirement, if small drops are to be frozen, because these are, from the entry up to complete full freezing in the nitrogen bath, surrounded by a gas pad and the individualization, required in order to avoid fusion of the drops, in the nitrogen bath leads to a requirement for a larger surface area with increasingly smaller drops.

Furthermore, these known devices cannot be modified for the explosion-proofing region, because electrical charging or sparking cannot be excluded due to the system with the mechanically moving parts.

SUMMARY OF THE INVENTION

The invention is therefore based on the object of providing a process and a device for pellet-freezing pourable and flowable materials, by means of which all drop sizes, in particular small drops, can be frozen individually, coupled with a small surface area requirement of the immersion bath and of the transport device.

The place of an elongate stationary immersion bath is therefore taken in the device according to the invention by a reaction tube, over the rim of which the liquefied gas, flowing in a cascade-like manner, is drawn in by an agitator. The transport and hence the individualization of the small drops is thus effected by the liquefied gas itself, whose velocity can be adjusted and controlled via the speed of rotation of the agitator. The residence time of the material to be frozen can thus be preset. The throughput can be simply adjusted to the optimum drop size, namely via the flow velocity of the liquefied gas and the dropping rate, without fusion of the drops occurring during the freezing, because the dropping rate is smaller than the flow velocity of the liquefied gas required for transporting the drops. While, in conventional immersion baths with transport belts, the drop size of small drops can, for functional reasons, not be smaller than a defined minimum size, the device according to the invention can be constructed in a small and compact manner independently of the drop size.

A further important criterion for optimum use is the operation of the device according to the invention in the explosion-proofing region, since there are no contacts between moving metallic parts. The individual parts of the completely sterilizable device can easily be dismantled and, due to only a few individual components, easily cleaned. All the materials used are approved for the food sector and pharmaceutical sector.

BRIEF DESCRIPTION OF THE DRAWINGS

An illustrative embodiment of the invention is shown diagrammatically in the drawing and is described in more detail below.

DETAILED DESCRIPTION

The drawing shows the device, which comprises an insulated housing 1, in which, according to the invention, there is a reaction tube 2 with an agitator 3 located at the lower end, without metallic contact. The reaction tube 2 and the agitator 3 stand vertically in the housing 1, and the drive is effected by a motor 6 arranged outside the insulated housing 1. The reaction tube 2 is connected to a supply pipe 7 which extends beyond the inlet aperture 18, of funnel-like design, of the reaction tube 2 up to the upper end of the housing 1 and hence above the level of the liquid nitrogen 11. The supply pipe 7 ends without metallic contact in a ribbon screw designed as a separating device 5 and having at least one perforated plate 8. The axis of rotation 9 of the ribbon screw 5 is obliquely inclined relative to the horizontal, and the drive is effected via a motor 10 arranged outside the insulated housing 1. A bath of liquid nitrogen is maintained in the housing 1 and in the reaction tube 2. The depth of the bath 11 is determined in the housing 1 by the inlet aperture 18 of the reaction tube 2 and, in the reaction tube 2 and hence in the supply pipe 7, by maintaining a cascade-like flow 12. The depth of the bath 11 in the reaction tube 2 is variable within certain limits and is affected by the quantity and size of the drops.

The charging device 13 for the material to be frozen is located directly above the inlet aperture 18 of the reaction tube 2 and points with its nozzle 4 to the flow 12. In the drawing, a charging device 13 with only one outlet aperture or nozzle 4 is shown, but a plurality of charging devices and/or a plurality of outlet apertures or nozzles can be provided.

The liquid nitrogen is supplied via a level-dependent valve 21 with an inflow aperture 22 pointing to the bath surface, and the vaporized nitrogen flows out through the product discharge aperture 23 in the insulated housing 1.

In operation, the agitator 3 draws in the nitrogen present in the reaction tube 2. In the agitator 3 itself, the pressure for further conveying of the nitrogen through the supply pipe 7 into the ribbon screw 5 is generated. From there, the nitrogen flows back through the perforated plates 8 into the housing 1 so that, at the inlet aperture 18 of the reaction tube 2, a cascade-like flow 12 is produced. The quantity of the liquid nitrogen present in the reaction tube 2 here affects the cascade-like flow 12 in such a way that different drop sizes or quantities are associated with equivalent quantities of nitrogen. The material to be frozen, for example a jet of liquid, emerging from the charging device 13 having at least one nozzle 4 is directed into this flow 12. Depending on the outlet velocity of the material to be frozen at the nozzle 4 of the charging device 13, the material to be frozen is broken up into jets, waves or drops. By means of the adjustable flow velocity of the liquid nitrogen in the reaction tube 2 and the quantity of liquid nitrogen, it is ensured that the liquid droplets of the material to be frozen are fixed as individual particles. For this purpose, the outlet velocity of the materials to be frozen from the charging device 13 is lower than the flow velocity of the flow 12 tumbling cascade-like into the reaction tube 2, so that the material to be frozen, which has been broken up into drops, waves or jets, enters the flow 12 in the form of drops and freezes completely while being conveyed further at high velocity. As a result, each drop of liquid is at a relative distance from the next drop. The pellets deep-frozen in the cascade-like flow 12 flow through the supply pipe 7 into the ribbon screw 5 which is fitted with perforated plates 8 and discharges the precipitated pellets from the product discharge aperture 23 of the housing 1.

What is claimed is:

1. A process for pellet-freezing pourable and flowable materials comprising providing a reaction tube in an insulated housing with the reaction tube having an open upper edge, providing a beth of low-boiling liquefied gas in the housing to the level of the upper edge of the reactor tube, flowing the liquefied gas over the upper edge and into the reaction tube in a cascade-like manner to create a cascade-like liquefied-gas flow, introducing the material to be frozen from at least one charging device into the cascade-like flow, and forming pellets from the material by the material contacting the cascade-like flow to cause the material to thereby freeze.

2. The process as claimed in claim 1, wherein the exit velocity of the material to be frozen from the charging device is lower than the flow velocity of the cascade-like flow.

3. The process as claimed in claim 1 including rotating an agitator in the lower end of the reaction tube to draw in the liquefied gas for creating the cascade-like flow.

4. A device for pellet-freezing pourable and flowable materials in a low-boiling liquefied gas comprising an insulated housing, a reaction tube in the interior of the housing, the reaction tube having an open upper edge whereby low-boiling liquefied gas in the housing may create a cascade-like flow when flowing into the reaction tube over its upper edge, a control assembly mounted to the housing for maintaining a controlled level of the liquefied gas in the housing, rotatably mounted agitator in the low end of the reaction tube, a charging device mounted in the housing and having an outlet nozzle directed at the upper end of the reaction tube for introducing the material to be frozen and for directing the material into the cascade-like flow for freezing the material into pellets, and a discharge unit connected to the reaction tube for discharging the frozen pellets out of the housing.

5. The device as claimed in claim 4, wherein the discharge unit includes a supply pipe connected to the reaction tube, the supply pipe ends above the level of the liquefied gas and the supply pipe is connected to a separating device.

6. The device as claimed in claim 5, wherein the separating device is a ribbon screw whose axis of rotation is obliquely inclined relative to the housing.

7. The device as claimed in claim 6, wherein the ribbon screw contains at least one perforated plate.

8. The device as claimed in claim 7, wherein the reaction tube, the agitator and the separating device are arranged without mutual metallic contact.

9. The device as claimed in claim 4, wherein the separating device is a ribbon screw whose axis of rotation is obliquely inclined relative to the housing.

10. The device as claimed in claim 4, wherein the ribbon screw contains at least one perforated plate.

11. The device as claimed in claim 4, wherein the reaction tube, the agitator and the separating device are arranged without mutual metallic contact.

* * * * *